(12) United States Patent
Murashige et al.

(10) Patent No.: US 12,459,234 B2
(45) Date of Patent: Nov. 4, 2025

(54) MULTILAYER STRUCTURE

(71) Applicant: Nitto Denko Corporation, Ibaraki (JP)

(72) Inventors: Takeshi Murashige, Osaka (JP); Junichi Inagaki, Osaka (JP); Keisuke Sato, Osaka (JP); Atsushi Kishi, Osaka (JP)

(73) Assignee: NITTO DENKO CORPORATION, Ibaraki (JP)

( * ) Notice: Subject to any disclaimer, the term of this patent is extended or adjusted under 35 U.S.C. 154(b) by 318 days.

(21) Appl. No.: 17/915,027

(22) PCT Filed: Mar. 10, 2021

(86) PCT No.: PCT/JP2021/009467
§ 371 (c)(1),
(2) Date: Sep. 27, 2022

(87) PCT Pub. No.: WO2021/199985
PCT Pub. Date: Oct. 7, 2021

(65) Prior Publication Data
US 2023/0053803 A1    Feb. 23, 2023

(30) Foreign Application Priority Data
Mar. 30, 2020    (JP) .................. 2020-059417

(51) Int. Cl.
*B32B 15/04*    (2006.01)
*B32B 7/12*    (2006.01)
(Continued)

(52) U.S. Cl.
CPC .......... *B32B 17/10018* (2013.01); *B32B 7/12* (2013.01); *B32B 15/08* (2013.01);
(Continued)

(58) Field of Classification Search
CPC ....................................................... B32B 7/12
(Continued)

(56) References Cited

U.S. PATENT DOCUMENTS

| 2001/0011779 A1* | 8/2001 | Stover ................. B29C 48/71 |
| | | 264/1.7 |
| 2007/0178292 A1* | 8/2007 | Hasegawa ............. B32B 27/42 |
| | | 428/216 |

(Continued)

FOREIGN PATENT DOCUMENTS

| CN | 104395071 A | 3/2015 |
| EP | 2732969 A1 | 5/2014 |

(Continued)

OTHER PUBLICATIONS

International Search Report dated Jun. 1, 2021, issued in counterpart Application No. PCT/JP2021/009467. (3 pages).
(Continued)

*Primary Examiner* — Lauren R Colgan
(74) *Attorney, Agent, or Firm* — WHDA, LLP

(57) ABSTRACT

A multilayer structure includes a resin layer, and a glass layer laminated on the resin layer via an adhesive layer, wherein a thickness of the glass layer is 10 μm or more and 300 μm or less, and an arithmetic mean waviness Wa of an interface of the resin layer and the adhesive layer is 10 μm or less.

8 Claims, 2 Drawing Sheets

(51) Int. Cl.
    *B32B 15/08* (2006.01)
    *B32B 17/06* (2006.01)
    *B32B 17/10* (2006.01)

(52) U.S. Cl.
    CPC ........ *B32B 17/10* (2013.01); *B32B 17/10247* (2013.01); *B32B 2250/05* (2013.01); *B32B 2307/412* (2013.01); *B32B 2307/732* (2013.01); *B32B 2307/7376* (2023.05)

(58) Field of Classification Search
    USPC .......................................................... 428/426
    See application file for complete search history.

(56) References Cited

U.S. PATENT DOCUMENTS

| | | | | |
|---|---|---|---|---|
| 2008/0286658 | A1* | 11/2008 | Kamo | G03H 1/0248 156/64 |
| 2009/0311497 | A1* | 12/2009 | Aoki | B32B 17/10614 428/222 |
| 2011/0244225 | A1* | 10/2011 | Hattori | C03C 17/3678 427/302 |
| 2012/0196103 | A1* | 8/2012 | Murashige | C03C 17/3405 156/60 |
| 2012/0202074 | A1* | 8/2012 | Hattori | H02S 30/00 428/436 |
| 2013/0032277 | A1* | 2/2013 | Hattori | B29C 66/944 156/231 |
| 2014/0154467 | A1* | 6/2014 | Yanase | B32B 17/10788 428/141 |
| 2015/0093542 | A1 | 4/2015 | Matsumoto et al. | |
| 2015/0174861 | A1 | 6/2015 | Hasegawa et al. | |
| 2015/0255740 | A1* | 9/2015 | Nakada | H10K 50/8426 257/40 |
| 2015/0367621 | A1* | 12/2015 | Murashige | B32B 38/0004 156/250 |
| 2020/0338854 | A1* | 10/2020 | Kim | B32B 7/022 |
| 2021/0107252 | A1 | 4/2021 | Kawamitsu et al. | |
| 2021/0229401 | A1* | 7/2021 | Choi | B32B 38/145 |
| 2021/0260852 | A1 | 8/2021 | Cho et al. | |

FOREIGN PATENT DOCUMENTS

| | | |
|---|---|---|
| EP | 4035890 A1 | 8/2022 |
| JP | 2000-296583 A | 10/2000 |
| JP | 2012-189986 A | 10/2012 |
| JP | 2013-231744 A | 11/2013 |
| JP | 2016-130980 A | 7/2016 |
| TW | 201130648 A1 | 9/2011 |
| TW | 201218147 A | 5/2012 |
| TW | 201243443 A | 11/2012 |
| TW | 201249643 A1 | 12/2012 |
| TW | 201341500 A | 10/2013 |
| WO | 2011/136327 A1 | 11/2011 |
| WO | 2013/008876 A1 | 1/2013 |
| WO | 2019/151091 A1 | 8/2019 |
| WO | 2021/033359 A1 | 2/2021 |
| WO | 2021/060155 A1 | 4/2021 |

OTHER PUBLICATIONS

Office Action dated Sep. 25, 2024, issued in counterpart TW Application No. 110109394, with English translation. (5 pages).
Extended (Supplementary) European Search Report dated Aug. 7, 2023, issued in counterpart EP Application No. 21781148.8. (9 pages).
Office Action dated Sep. 12, 2023, issued in JP counterpart Application No. 2020-059417, with English Translation. (8 pages).
Office Action dated Mar. 5, 2024, issued in counterpart JP Application No. 2020-059417, with English translation. (6 pages).
Office Action dated Jun. 13, 2024, issued in counterpart TW Application No. 110109394, with English translation. (9 pages).
Office Action dated Feb. 18, 2025, issued in counterpart JP Application No. 2024-071283, with English translation. (11 pages).
Office Action dated Mar. 13, 2025, issued in counterpart TW Application No. 110109394, with English translation. (12 pages).
Office Action dated Jun. 17, 2025, issued in counterpart JP Application No. 2024-071283, with English translation(9 pages).
Office Action dated Jul. 30, 2025, issued in counterpart CN Application No. 202180024540.1, with English translation (11 pages).
Office Action dated Aug. 29, 2025, issued in counterpart TW Application No. 110109394, with English translation (15 pages).
Photonics Technology and Applications, vol. 1/edited by Liu Songhao, Guangzhou: Guangdong Science & Technology Press, Hefei: Anhui Science & Technology Press, 2006(6 pages); cited in CN Office Action dated Jul. 30, 2025.

* cited by examiner

MULTILAYER STRUCTURE

TECHNICAL FIELD

The present invention relates to a multilayer structure.

BACKGROUND ART

Multilayer structures in which two or more layers are laminated is known. An example is a multilayer structure in which a silver reflecting layer is laminated on a thin glass layer (glass film). Such multilayer structures have surface hardness, dimensional stability, chemical resistance, lightness, and flexibility. Therefore, use of such a multilayer structure will enable elimination of a danger due to weight or cracking, which has been a problem of a conventional sheet glass, and such a multilayer structure replaces a conventional one in various applications.

RELATED ART DOCUMENTS

Patent Document

Patent Document 1: Japanese Unexamined Patent Application Publication No. 2013-231744

SUMMARY OF THE INVENTION

Problem to be Solved by the Invention

A multilayer structure in which a thin glass layer as described above is laminated through an adhesive layer on a resin layer can also be considered. In such a multilayer structure, the lower layer side is visible through the glass layer, but visibility of the lower layer side may be reduced. The decrease in visibility leads to a decrease in quality, for example, when a multilayer structure is used for a mirror finish or a decorative plate.

It is an object of the present invention to provide a multilayer structure having improved visibility through a glass layer.

Means for Solving the Problem

In one aspect according to the present invention, a multilayer structure includes
 a resin layer; and
 a glass layer laminated on the resin layer via an adhesive layer, wherein
 a thickness of the glass layer is 10 μm or more and 300 μm or less, and
 an arithmetic mean waviness Wa of an interface of the resin layer and the adhesive layer is 10 μm or less.

Advantageous Effect of the Present Invention

According to the disclosed technology, a multilayer structure having improved visibility through a glass layer can be provided.

EMBODIMENTS FOR CARRYING OUT THE INVENTION

First Embodiment

[Multilayer Structure]

Figure 1:
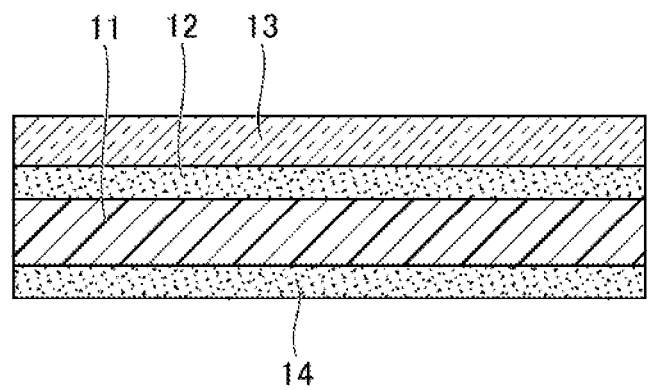
FIG. 1 is a cross-sectional view illustrating a multilayer structure according to a first embodiment.

Hereinafter, modes for carrying out the invention will be described with reference to the drawings. In drawings, the same constituent elements may be denoted by the same reference numerals and duplicate explanation thereabout may be omitted.

FIG. 1 is a cross-sectional view illustrating a multilayer structure according to a first embodiment. As illustrated in FIG. 1, a multilayer structure 10 includes a resin layer 11, an adhesive layer 12, a glass layer 13, and an adhesive layer 14. In the multilayer structure 10, the glass layer 13 is laminated on the resin layer 11 via the adhesive layer 12. The adhesive layer 14 is formed on a surface of the resin layer 11 on a side opposite to a side where the adhesive layer 12 is laminated.

However, the adhesive layer 14 may be provided as needed. For example, immediately before the glass layer 13 laminated on the resin layer 11 via the adhesive layer 12 is stuck to the adherend, a double-sided tape or the like may be stuck to a lower surface of the resin layer 11 or a double-sided tape or the like may be stuck to the side of the adherend.

The planar shape of the multilayer structure 10 (a shape seen from the normal direction of an upper surface of the glass layer 13) may be a rectangular shape, a circular shape, an elliptical shape, a combination thereof, or any other suitable shape. Since the multilayer structure 10 has flexibility, the multilayer structure 10 can be easily attached to a curved surface.

The inventors, through intensive investigations, have found that when a lower layer side is visually identified through the glass layer 13, and the planarity of the lower layer is poor, the visibility is reduced, and that the planarity of an interface between the resin layer 11 and the adhesive layer 12 would most affect the reduction in visibility.

Here, the planarity is an average height difference (i.e., waviness) from the average plane in the reference length, and can be expressed by, for example, the arithmetic mean waviness Wa. In the present application, the arithmetic mean waviness Wa means a value measured with the reference length of 10 cm in compliance with JIS-B-0601 (2013) of the Japanese Industrial Standards.

The arithmetic mean waviness Wa of the interface between the resin layer 11 and the adhesive layer 12, that is, the arithmetic mean waviness Wa of the surface of the resin layer 11 in contact with the adhesive layer 12 is 10 μm or less. The arithmetic mean waviness Wa of the interface between the resin layer 11 and the adhesive layer 12 is preferably 5 μm or less. The lower limit value of the arithmetic mean waviness Wa at the interface between the resin layer 11 and the adhesive layer 12 may be 0 μm, but it is normally larger than 0 μm (e.g., several μm).

In this case, the arithmetic mean waviness Wa does not include a local swelling such as a defect.

When the arithmetic mean waviness Wa of the interface between the resin layer 11 and the adhesive layer 12 is within the above-described range, the planarity of the surface of the resin layer 11 in contact with the adhesive layer 12 is improved, so that the visibility when the lower layer side is visually identified through the glass layer 13 can be improved. As a result, for example, when the multilayer structure 10 is used with a mirror finish, or when the multilayer structure 10 is used as a transparent protective film, a decorative plate, or the like, the quality (texture) can be improved.

Since the adhesive layer 12 follows the shape of the resin layer 11, the arithmetic mean waviness Wa of the surface of the adhesive layer 12 in contact with the resin layer 11 is equal to the arithmetic mean waviness Wa of the surface of the resin layer 11 in contact with the adhesive layer 12.

The arithmetic mean waviness Wa of the interface between the resin layer 11 and the adhesive layer 12 can fall within the above-described range by adjusting the molding conditions at the time of molding the resin layer 11 or by polishing the surface of the resin layer after molding. Alternatively, a commercially available resin film may be obtained, the arithmetic mean waviness Wa may be measured, and a resin film in which the arithmetic mean waviness Wa falls within the above-described range may be selected.

Here, materials and the like of each part of the multilayer structure 10 will be described.

[Resin Layer]

The resin layer 11 is a base material on which the glass layer 13 and the like are laminated, and the resin layer 11 has flexibility. The resin layer 11 includes one or a plurality of layers. When the resin layer 11 includes a plurality of layers, it is preferable that the layers of the resin layer are laminated via a cohesive layer having an adhesive function. The total thickness of the resin layer 11 may be 20 μm or more and 1000 μm or less, preferably 25 μm or more and 500 μm or less, and more preferably 25 μm or more and 300 μm or less, from the viewpoint of flexibility.

The elastic modulus of the resin layer 11 is preferably 1 GPa or more, and preferably 10 GPa or less, from the viewpoint of waviness.

Examples of the material of the resin layer 11 include polyester resins such as polyethylene terephthalate resins and polyethylene naphthalate resins, cycloolefin resins such as norbornene resins, polyether sulfone resins, polycarbonate resins, acrylic resins, polyolefin resins, polyimide resins, polyamide resins, polyimide amide resins, polyarylate resins, polysulfone resins, polyether imide resins, urethane resins, and the like.

For example, when the resin layer 11 is desired to have impact absorbing properties, a urethane resin is preferably used as the material of the resin layer 11. When the resin layer 11 is desired to have hardness, a polyethylene terephthalate resin is preferably used as the material of the resin layer 11.

The resin layer 11 may be transparent. For example, when the resin layer 11 and the adhesive layer 12 are made of a material that is transparent to visible light, the multilayer structure 10 can be used as a protective film for protecting window glass of a vehicle from stones or the like. As such an application, it is possible to use a protective film having a resin surface, but when the surface is resin, the protective performance is low, and the resin on the surface may be discolored by an adverse effect of exhaust gas or the like.

Meanwhile, since the surface of the multilayer structure 10 is the glass layer 13, the surface of the multilayer structure is less likely to be scratched than that of the protective film having a resin surface, and can exhibit high protection performance. Further, since the surface of the multilayer structure 10 is the glass layer 13, the multilayer structure 10 has high durability and chemical resistance, and the risk of deterioration such as discoloration of the resin layer 11 below the glass layer 13 can be reduced.

The resin layer 11 may be an opaque decorative layer imparted with designability. The decorative layer may be a layer with a monochromatic color or a layer with any desired pattern, figure, character or the like.

For example, by making the resin layer 11 a black decorative layer, the multilayer structure 10 may be of a mirror finish corresponding to a piano finish (sometimes called piano paint or piano black).

In a conventional piano finish, a method of laminating a plurality of urethane resin layers on a base material such as a resin layer is adopted, and the piano finish is formed through a very complicated process. Further, since the piano finish surface obtained by this method is made of resin, the surface is susceptible to scratching, and durability and chemical resistance are thus inferior.

By contrast, when the multilayer structure 10 in which the resin layer 11 is a black decorative layer is used, a mirror finish equivalent to a piano finish can be easily achieved without a complicated process by simply sticking the multilayer structure 10 to the adherend. Further, since the surface of the multilayer structure 10 is a glass layer 13, the surface is less likely to be scratched, and durability and chemical resistance are thus improved compared with the conventional piano finish resin surface.

The black decorative layer can be achieved by, for example, adding a black colorant in a resin. Alternatively, the resin may be combined with a cyan colorant, a magenta colorant, a yellow colorant, and optionally, a black colorant.

Here, black basically means a black color in which a value of L* defined by the L*a*b* color system is 35 or less (0 to 35) [preferably 30 or less (0 to 30), and more preferably 25 or less (0 to 25)]. In black, values of a* and b* defined by the L*a*b* color system can be appropriately selected according to the value of L*. As a* and b*, for example, the values are both preferably in the range of −10 to 10, more preferably in the range of −5 to 5, and particularly preferably in the range of −3 to 3 (among the range, 0 or almost 0).

The values of the L*, a*, and b* specified in the L*a*b* color system are, for example, measured by a color difference meter (product name "CR-200" manufactured by Minolta); colorimeter). The L* a* b* system is a color space recommended by the International Commission on Illumination (CIE) in 1976, which means a color space called the CIE 1976 (L* a* b*) system. The L*a*b* color system is specified in JIS-Z-8729 of the Japanese Industrial Standards.

[Adhesive Layer]

Any suitable adhesive may be used as the adhesive layer 12. The thickness of the adhesive layer 12 is preferably 0.5 μm or more and 25 μm or less, more preferably 0.5 μm or more and 5 μm or less, and more preferably 0.5 μm or more and 3 μm or less, from the viewpoint of waviness.

As the adhesive layer 12, for example, an acrylic pressure-sensitive adhesive, a silicone pressure-sensitive adhesive, a rubber pressure-sensitive adhesive, an ultraviolet curable acrylic adhesive, an ultraviolet curable epoxy adhesive, a thermosetting epoxy adhesive, a thermosetting melamine adhesive, a thermosetting phenolic adhesive, an ethylene vinyl acetate (EVA) interlayer, a polyvinyl butyral (PVB) interlayer, or the like can be used.

When the adhesive layer 14 is provided, any pressure-sensitive adhesive or any adhesive exemplified as the adhesive layer 12 can be used. The thickness of the adhesive layer 14 may be, for example, the same as that of the adhesive layer 12.

In the present specification, a pressure-sensitive adhesive refers to a layer that has adhesiveness at room temperature and adheres to the adherend under light pressure. Accordingly, even when the adherend adhered to the pressure-sensitive adhesive is peeled off, the pressure-sensitive adhesive retains a practical tack strength. The adhesive, on the other hand, refers to a layer that can bind a substance by intervening between the substances. Therefore, when the adherend adhered to the adhesive is peeled off, the adhesive does not have a practical adhesive strength.

[Glass Layer]

The glass layer 13 is not particularly limited, and an appropriate glass layer can be adopted in accordance with the purpose. The glass layer 13 may be, for example, soda lime glass, boric acid glass, aluminosilicate glass, quartz glass or the like according to the classification by composition. According to the classification by the alkali component, alkali-free glass and low alkali glass are given. The content of the alkali metal component (e.g., $Na_2O$, $K_2O$, $Li_2O$) of the glass is preferably 15 wt % or less, and more preferably 10 wt % or less.

The thickness of the glass layer 13 is preferably 10 µm or more in consideration of the surface hardness, airtightness, and corrosion resistance of the glass. Since the glass layer 13 is preferably flexible like a film, the thickness of the glass layer 13 is preferably 300 µm or less. The thickness of the glass layer 13 is more preferably 30 µm or more and 200 µm or less, and particularly preferably 50 µm or more and 100 µm or less.

The light transmittance of the glass layer 13 at a wavelength of 550 nm is preferably 85% or more. The refractive index of the glass layer 13 at a wavelength of 550 nm is preferably 1.4 to 1.65. The density of the glass layer 13 is preferably 2.3 $g/cm^3$ to 3.0 $g/cm^3$, and more preferably 2.3 $g/cm^3$ to 2.7 $g/cm^3$.

The method of forming the glass layer 13 is not particularly limited, and an appropriate method can be adopted in accordance with the purpose. Typically, the glass layer 13 can be prepared by melting a mixture containing a main raw material such as silica or alumina, an antifoaming agent such as mirabilite and antimony oxide, and a reducing agent such as carbon at a temperature of approximately 1400° C. to 1600° C., molding the mixture into a thin plate, and then cooling the thin plate. Examples of the method of forming the glass layer 13 include a slot-down draw method, a fusion method, and a float method. The glass layer formed in a plate-like shape by these methods may be chemically polished with a solvent such as hydrofluoric acid, if necessary, for thinning or enhancing smoothness.

A functional layer such as an antifouling layer, an antireflection layer, a conductive layer, a reflection layer, and a decoration layer may be provided on a surface of the glass layer 13.

[Manufacturing Method]

The laminated portion of the resin layer 11, the adhesive layer 12 and the glass layer 13 is obtained by laminating, through the adhesive layer 12, the resin layer 11 and the glass layer 13 formed in a predetermined shape by pressing or the like. Alternatively, the resin layer 11 and the glass layer 13 may be continuously laminated via the adhesive layer 12 by using a roll-to-roll process, and then divided into pieces in any desired size by pressing or the like.

[Application]

The multilayer structure 10 is used, for example, for a member for giving a luster to wall surfaces of a building, surfaces of furniture or household electric appliances, a protective film, a decorative plate, a partition, or the like. The same applies to the multilayer structures exemplified below.

Modifications of First Embodiment

A modification of the first embodiment illustrates an example of a multilayer structure having a layer structure different from that of the first embodiment. In the modification of the first embodiment, description of the same components as those of the above-described embodiment may be omitted.

Figure 2:
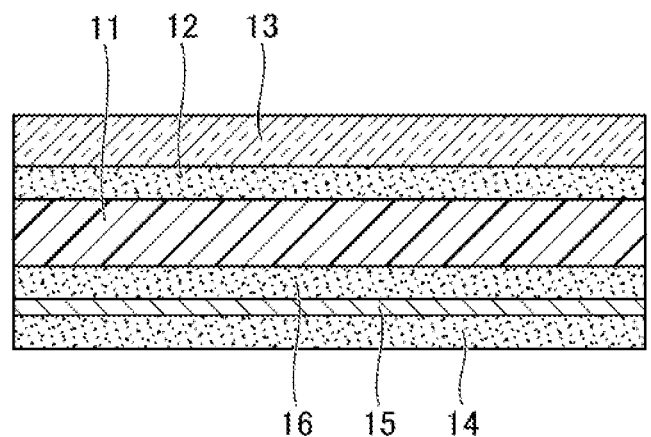
FIG. 2 is a cross-sectional view illustrating a multilayer structure according to a first modification of the first embodiment.

FIG. 2 is a cross-sectional view illustrating a multilayer structure according to a first modification of the first embodiment. As illustrated in FIG. 2, a multilayer structure 10A differs from the multilayer structure 10 (see FIG. 1) in that a metal layer 15 is laminated via an adhesive layer 16 on a side of the resin layer 11 opposite to a side on which the glass layer 13 is laminated via the adhesive layer 12.

Since the resin layer 11 is an opaque layer (e.g., the decorative layer described in the first embodiment), the metal layer 15 and the adhesive layer 16 are not visible from the glass layer 13 side. In this case, the planarity of the surfaces of the metal layer 15 and the adhesive layer 16 does not affect the visibility from the glass layer 13 side.

The thickness of the metal layer 15 is preferably 10 µm or more and 2000 µm or less, from the viewpoint of maintaining flexibility and improving strength. Examples of the material of the metal layer 15 include stainless steel, copper, aluminum, iron, nickel, permalloy, and the like. A commercially available stainless-steel foil, copper foil, aluminum foil, or the like may be used as the metal layer 15.

The adhesive layer 16 may be any pressure-sensitive adhesive or any adhesive exemplified as the adhesive layer 12. The thickness of the adhesive layer 16 may be, for example, the same as that of the adhesive layer 12.

Thus, by providing the metal layer 15 below the resin layer 11, the strength of the multilayer structure 10A can be improved while maintaining flexibility.

When a ferromagnetic material such as iron, nickel or permalloy is selected as the material of the metal layer 15, a magnet can be attracted to the multilayer structure 10A. For example, when the multilayer structure 10A is used as a decorative plate to be stuck on the surface of a refrigerator, a memo magnet, a rack with a magnet for storing small articles, and the like can be attracted to the multilayer structure 10A.

The magnet is attracted to the lower metal layer 15 because the resin layer 11, the adhesive layer 12, and the glass layer 13 are so thin as to have flexibility, and this effect cannot be obtained when a conventional thick sheet glass is used.

Figure 3:
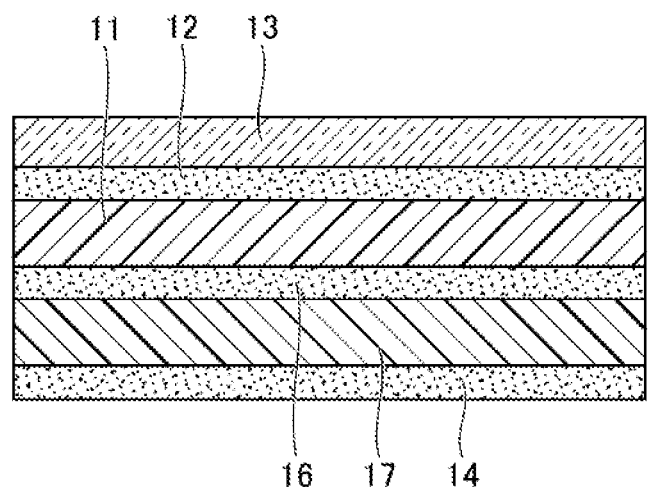
FIG. 3 is a cross-sectional view illustrating a multilayer structure according to a second modification of the first embodiment.

FIG. 3 is a cross-sectional view illustrating a multilayer structure according to a second modification of the first embodiment. As illustrated in FIG. 3, a multilayer structure 10B differs from the multilayer structure 10 (see FIG. 1) in that a buffer layer 17 is laminated via the adhesive layer 16 on a side of the resin layer 11 opposite to a side on which the glass layer 13 is laminated via the adhesive layer 12.

Since the resin layer 11 is an opaque layer (e.g., the decorative layer described in the first embodiment), the adhesive layer 16 and the buffer layer 17 are not visible from the glass layer 13 side. In this case, the planarity of the surfaces of the adhesive layer 16 and the buffer layer 17 does not affect the visibility from the glass layer 13 side.

The buffer layer 17 is a layer having cushioning properties. The thickness of the buffer layer 17 is preferably 100

μm or more and 2000 μm or less, from the viewpoint of developing a good cushioning property. Examples of the material of the buffer layer 17 include a urethane resin and various foaming materials. Examples of the various foaming materials include a polyolefin resin, a polypropylene resin, a polystyrene resin, a polyethylene resin, and the like. A commercially available foamed sheet may be used as the buffer layer 17. Examples of commercially available foamed sheets include SCF (registered trademark) manufactured by Nitto Denko Corporation.

Thus, by providing the buffer layer 17 below the resin layer 11, the cushioning property of the multilayer structure 10B can be enhanced, and the impact applied to the multilayer structure 10B from the outside can be softened. Instead of the buffer layer 17 or in addition to the buffer layer 17, a layer having another function such as a heat insulating layer may be laminated.

In the multilayer structure 10A illustrated in FIG. 2, the adhesive layer 16 and the buffer layer 17 illustrated in FIG. 3 may be laminated below the metal layer 15.

Although the preferred embodiments and the like have been described in detail above, various modifications and substitutions can be made to the embodiments and the like without departing from the scope of the claims.

This international application claims priority under Japanese Patent Application No. 2020-059417, filed with the Japanese Patent Office on Mar. 30, 2020, and the entire contents of Japanese Patent Application No. 2020-059417 are incorporated herein by reference.

DESCRIPTION OF REFERENCE CODES 10, 10A, 10B multilayer structure
11 resin layer
12, 14, 16 adhesive layer
13 glass layer
15 metal layer
17 buffer layer

The invention claimed is:

1. A multilayer structure comprising:
   a resin layer; and
   a glass layer laminated on the resin layer via an adhesive layer, wherein
   a thickness of the glass layer is 10 μm or more and 300 μm or less, and
   an arithmetic mean waviness Wa of an interface of the resin layer and the adhesive layer is 10 μm or less.

2. The multilayer structure according to claim 1, wherein a thickness of the resin layer is 20 μm or more and 1000 μm or less.

3. The multilayer structure according to claim 1, wherein the resin layer is transparent.

4. The multilayer structure according to claim 1, wherein the resin layer is a decorative layer.

5. The multilayer structure according to claim 4, wherein the decorative layer is black.

6. The multilayer structure according to claim 1, further comprising:
   a metal layer laminated, via a second adhesive layer, on a side of the resin layer opposite to a side on which the glass layer is laminated.

7. The multilayer structure according to claim 6, wherein the metal layer is a ferromagnetic material.

8. The multilayer structure according to claim 1, further comprising:
   a buffer layer laminated via a second adhesive layer on a side of the resin layer opposite to a side on which the glass layer is laminated.

* * * * *